(12) United States Patent
Narla et al.

(10) Patent No.: US 9,009,599 B2
(45) Date of Patent: Apr. 14, 2015

(54) TECHNIQUE FOR HANDLING URLS FOR DIFFERENT MOBILE DEVICES THAT USE DIFFERENT USER INTERFACE PLATFORMS

(75) Inventors: Madan Mohan Narla, North Brunswick, NJ (US); Siva Babu Shake, Piscataway, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 647 days.

(21) Appl. No.: 12/905,752

(22) Filed: Oct. 15, 2010

(65) Prior Publication Data

US 2012/0096366 A1 Apr. 19, 2012

(51) Int. Cl.
*G06F 3/01* (2006.01)
*H04L 29/08* (2006.01)
*H04W 4/00* (2009.01)
*H04W 4/18* (2009.01)

(52) U.S. Cl.
CPC .......... *H04L 67/2814* (2013.01); *H04W 4/003* (2013.01); *H04W 4/18* (2013.01); *H04L 67/303* (2013.01); *H04L 67/04* (2013.01); *H04L 67/327* (2013.01)

(58) Field of Classification Search
None
See application file for complete search history.

(56) References Cited

U.S. PATENT DOCUMENTS

| | | | | |
|---|---|---|---|---|
| 7,136,930 | B1 * | 11/2006 | Leppinen | 709/238 |
| 7,873,722 | B2 * | 1/2011 | Paul et al. | 709/223 |
| 8,340,635 | B2 * | 12/2012 | Herz et al. | 455/411 |
| 8,718,028 | B1 * | 5/2014 | Upadhyay et al. | 370/338 |
| 2001/0047426 | A1 | 11/2001 | Hunter | |
| 2004/0181550 | A1 * | 9/2004 | Warsta et al. | 707/104.1 |
| 2004/0236847 | A1 | 11/2004 | Roy et al. | |
| 2005/0188056 | A1 * | 8/2005 | Kangas et al. | 709/218 |
| 2006/0168224 | A1 * | 7/2006 | Midgley | 709/226 |
| 2008/0109528 | A1 * | 5/2008 | Knight et al. | 709/217 |
| 2008/0147864 | A1 * | 6/2008 | Drogo De Iacovo et al. | 709/226 |
| 2008/0155400 | A1 * | 6/2008 | Christensen | 715/273 |
| 2008/0215733 | A1 * | 9/2008 | Paul et al. | 709/225 |
| 2008/0235573 | A1 * | 9/2008 | Serdy et al. | 715/239 |
| 2009/0024698 | A1 * | 1/2009 | Ho et al. | 709/203 |
| 2009/0276716 | A1 * | 11/2009 | Chua | 715/744 |
| 2010/0017464 | A1 * | 1/2010 | Cheng et al. | 709/203 |
| 2010/0017502 | A1 * | 1/2010 | Cheng et al. | 709/219 |
| 2010/0095024 | A1 * | 4/2010 | Wyler et al. | 709/246 |
| 2010/0169763 | A1 * | 7/2010 | Zahavi et al. | 715/234 |
| 2010/0173646 | A1 * | 7/2010 | Cheng | 455/456.1 |
| 2010/0174607 | A1 * | 7/2010 | Henkin et al. | 705/14.53 |
| 2010/0233996 | A1 * | 9/2010 | Herz et al. | 455/411 |
| 2010/0241761 | A1 * | 9/2010 | Lee et al. | 709/242 |
| 2010/0299591 | A1 * | 11/2010 | Suehiro et al. | 715/239 |
| 2011/0055247 | A1 * | 3/2011 | Blumberg et al. | 707/769 |

(Continued)

*Primary Examiner* — William Bashore
*Assistant Examiner* — Hien Duong

(57) ABSTRACT

The examples provided teach techniques and devices used to route a request received from a mobile station via a URL link that is independent from the user interface platform used on the mobile device. This request is received at a web server which routes the request to an application server based on the URL link. The application identifies the user interface platform used by the mobile station and determines whether the application is supported by that user interface platform. If the application is not supported by the user interface platform, the application server reroutes the request to another application server having the application that is supported by the user interface platform and the application at the other server carries out the request and sends the response to the mobile station.

25 Claims, 4 Drawing Sheets

(56) References Cited

U.S. PATENT DOCUMENTS

| | | |
|---|---|---|
| 2011/0131484 A1* | 6/2011 | Paul et al. .................... 715/239 |
| 2011/0185354 A1* | 7/2011 | Tanner et al. ................ 717/178 |
| 2011/0269437 A1* | 11/2011 | Marusi et al. .............. 455/414.1 |
| 2012/0016748 A1* | 1/2012 | Aaltonen et al. ........... 705/14.64 |
| 2012/0047199 A1* | 2/2012 | Patrawala et al. ............. 709/203 |
| 2012/0047425 A1* | 2/2012 | Ahmed ........................ 715/234 |

* cited by examiner

US 9,009,599 B2

TECHNIQUE FOR HANDLING URLS FOR DIFFERENT MOBILE DEVICES THAT USE DIFFERENT USER INTERFACE PLATFORMS

TECHNICAL FIELD

The present subject matter relates to techniques and equipment that allow a wireless telephone service provider to supply one URL link for specific URL content to all mobile stations, independent of user interface platforms of different mobile stations. The network will respond to the URL link with content that is formatted the appropriate user interface platform.

BACKGROUND

In recent years, downloading multimedia content to one's mobile station has become commonplace. Verizon Wireless's virtual store, or "VStore," is a web application that provides customers a browser interface on their feature phones, smart mobile phones and advanced mobile phones for various storefronts, for example, stores offering tones, games and tools and applications, by providing a categorized display of device-specific content types. Users can access each of these stores to browse through the categories and view the details of the items and purchase them.

Apart from the traditional way of accessing these storefronts, businesses also wanted a direct way of providing access to specific items as a part of promotions and regular advertisements. Based on the business requests, a specific URL pattern was established which would be recognized by the browser application to allow faster access to the storefront. By using this URL, businesses can construct different dynamic URLs in the specified format if the item details are known. The application is made capable of handling all such URLs after establishing their origin and proper authentication. The URLs corresponding to specific items of promotion will be advertised in the ad space on other mobile browser applications and portals. When customers click on the ads, the request is specifically directed to the item detail page of the item being promoted and users can then simply purchase the item with one click without going through the hassles of starting from category level and digging down to specific items. URL links such as those described to are often referred to as "deep linking URLs." In short, it is a "one click" process to purchase something that the user likes.

Different types and/or different generations of mobile stations implement a variety of different browsers and related applications for the user interface to on-line content, including on-line stores. In order to execute the "one click" process using the existing application architecture, each of the mobile stations must be provided a URL that is specific to that station's browser platform.

Feature phones, for example, use Java technologies, while smart phones and advanced phones use different portal technologies. It is desirable that the URL content be displayed the same way regardless of user interface platform. However, in order to be displayed correctly, the link must be provided in the correct application format that is compatible with the user interface platform of the user's particular mobile station. As technology has improved, the mobile stations have developed more features and advanced capabilities. Because of this, different applications are used based on device category. This is in part because the later applications, such as those used on advanced phones, provide additional features and functionality not possible on older mobile stations, such as feature phones. For example, a WAP application is used for feature phones, an SMI application is used for smart phones, and MW3 application is used for advanced phones. The SMI application provides additional features that cannot be run on feature phones, while the MW3 application provides features that cannot be run on feature phones or advanced phones.

FIG. 5 is a flowchart of a process for routing and processing URL requests received from three different types of mobile stations using user interface platform specific URLs as executed in the prior art. In FIG. 5, the customer launches the browser on the mobile station and the browser provides a default home page URL for the browser. For example, for a mobile service provider whose system support all three types of phones, the browser may point to a different starting page for each category of phone. For example, for Verizon, the URL on feature phones points to MW2.0 portal, to a VZStart page for some smart phones built on IBM portal server, and to MW3.0 portal for a large variety of new advanced devices. Sales and marketing ads can feature on any of these portal pages or applications. When the user clicks on an ad (that points to a specific promotional item), the request hits the web server that front-ends the specific application that supports the device category the request originated from. Each device category has a specific link that directs it to a different application server based on the application required by the device.

For example, if the user was to click on the ad from a feature phone at step 5S1a, the link would send the request through network directly to a WAP application at step 5S2a. If the URL link was clicked from a smart phone at step 5S1b, the request would be sent through the network directly to a SMI application at step 5S2b. Finally, if the URL request was sent from an advanced phone at step 5S1c, the request would be sent through the application directly to the MW3 server at step 5S2c. In each case, the request will be processed by the application supported by the user interface platform used by the particular mobile station at steps 5S3a, 5S3b, or 5S3c, respectively, in order to obtain the relevant content in the appropriate format for the mobile station. The content is then sent back to the mobile station to be displayed at steps 5S4a, 5S4b, or 5S4c. Using this process, a URL specific to either the WAP application, SMI application, or MW3 application is provided to each phone such that the request is directed to the specific application supported by the user interface platform allowing the user to access to that specific item detail page of "VStore" directly and so that the user may view it in the correct format.

Although this "One-Click" process is useful to the customer, implementing the process is more complicated for those providing the links. In order to provide the content in a consistent format independent of the browser platform, a different link must be provided for each browser platform such that three different links are required to access the same content. Given that each link is used to access a specific piece of content, such as a particular song or ring tone, having to provide browser specific links increases the amount of work significantly. Further as additional browser platforms develop, work will be required in order to display the URL correctly on all feature devices as well as those already in existence.

Hence a need exists for a way to provide browser content to all mobile stations in a format compatible with the mobile station's user interface platform using a one URL link that may be used by various mobile stations independent of the mobile stations' browser platforms.

SUMMARY

The teachings herein alleviate one or more of the above noted problems with providing content compatible with different user interfaces, for example, problems created by different user interface platforms that are compatible with some content and applications but not others. In the specific examples, incompatibility related issues created by content provided through a URL link and the user interface platform of a mobile station are alleviated.

For example, the detailed description teaches techniques and devices used to route a request received from a mobile station via a URL link that is independent from the user interface platform used on the mobile device. This request is received at a web server which routes the request to an application based on the URL link. The application identifies the user interface platform used by the mobile station from the request and determines whether the application is supported by that user interface platform. If the particular user interface does not support the application, the request is rerouted to another application that does support the user interface platform, for carrying out the request.

As a result, the mobile service provider of the content requested via the URL need only provide one URL link to all mobile stations in order to deliver the requested content in the appropriate formats. Platform specific URLs need not be provided to each type of mobile station. As a result, the amount of work required to provide the requested content in the appropriate formats is reduced, allowing the mobile service provider more time to focus on the content itself.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
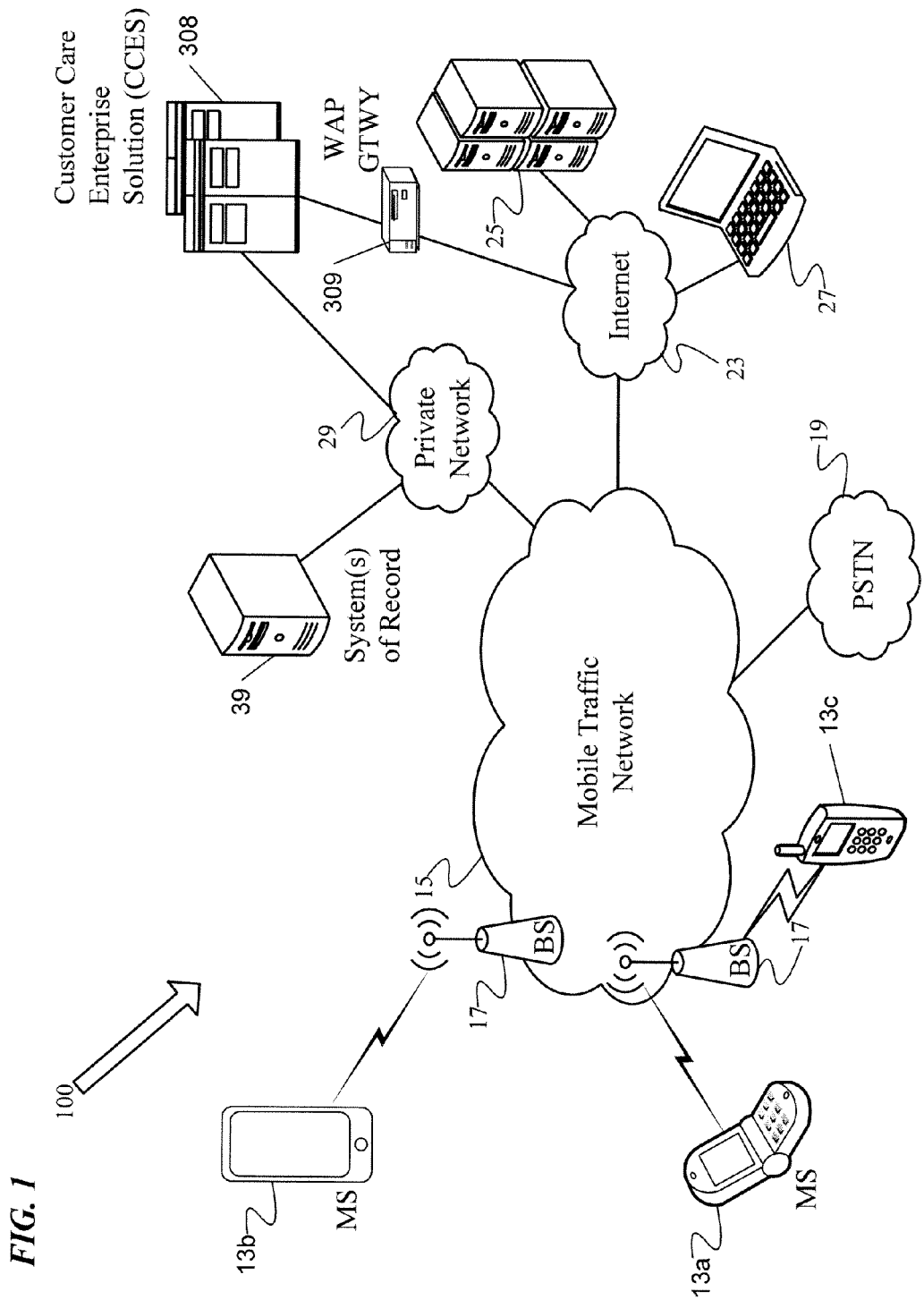
FIG. 1 illustrates a functional block diagram of a Mobile Service Provider network including elements/systems that may be utilized to handle URLs for different mobile stations using different user interface platforms.

Reference now is made in detail to the examples illustrated in the accompanying drawings and discussed below. FIG. 1 illustrates a system 100 offering a variety of mobile communication services, including the ability to obtain browser content with one click, by mobile station users. The example shows simply three mobile stations (MSs) 13a, 13b, and 13c as well as a mobile communication network 15. The stations 13a, 13b, and 13c are examples of mobile stations that may be used for a variety of communication functions, including for purposes of this discussion, to obtain multimedia content from an on-line store using the "One-Click" feature. However, the network will provide similar communications for many other similar users as well as for mobile devices/users that do not use the on-line store or its "One-Click" feature. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The network 15 allows users of the mobile stations such as 13a, 13b, and 13c (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23. The data services for the mobile stations 13 via the Internet 23 may be with devices like those shown at 25 and 27 as well as with a variety of other types of devices or systems capable of data communications through various interconnected networks. Such data services may include services which allow the user of the mobile station to download and obtain on-line content.

For purposes of a representative example, the drawings show and we will discuss a mobile network and VStore as the example of a network where the carrier operates an on-line store that implements the methods of handling URLs for different mobile devices that use different user interface platforms, and some of the terms used below may be applicable to that Verizon Wireless example. Those skilled in the art will appreciate, however, that the present teachings are applicable to other on-line content distribution services and networks.

Mobile stations 13 can take the form of portable handsets including feature phones, smart phones, and advanced phones. Program applications, including an application to browse and obtain multimedia content and/or an application purchased via the online "VStore" service can be configured to execute on many different types of mobile stations 13 specific to each device's user interface platform.

The mobile communication network 15 can be implemented by a number of interconnected networks. Hence, the overall network 15 may include a number of radio access networks (RANs), as well as regional ground networks interconnecting a number of RANs and a wide area network (WAN) interconnecting the regional ground networks to core network elements. A regional portion of the network 15, such as regional portion serving mobile stations 13, can include one or more RANs and a regional circuit and/or packet switched network and associated signaling network facilities.

Physical elements of a RAN, operated by one of the mobile service providers or carriers, include a number of base stations represented in the example by the base stations (BSs) 17.

The radio access networks can also include a mobile communication network represented generally by the cloud at 15, which carries the user communications and data for the mobile stations 13 between the base stations 17 and other elements with or through which the mobile stations communicate. Specific elements of the network 15 for carrying the voice and data traffic and for controlling various aspects of the calls or sessions through the network 15 are omitted here form simplicity.

A mobile station 13 communicates over the air with a base station 17 and through the mobile communication network 15 for various voice and data communications, e.g. through the Internet 23 with a server 25 and/or with other application servers. If the mobile service carrier offers the "One-Click" feature, the service may be hosted on a carrier operated system of servers, such as a Customer Care Enterprise Solution (CCES) server 308, for communication via the networks 15 and 29. Alternatively, the "One-Click" feature may be provided by a separate entity (alone or through agreements with the carrier), in which case, the service may be hosted on an application server such as server 25 connected for communication via the networks 15 and internet 23. Server 25 may provide any of a variety of common application or service functions in support of or in addition to an application program running on the mobile station 13 as would be carried out by the CCES 308. However, for purposes of further discussion, we will focus on functions thereof in support of a mobile VStore "One-Click" service. For a given service, including the "One-Click" service, a user interface platform within the mobile station 13 may be considered as a 'client' and the programming within CCES 308 may be considered as the 'server' for the particular service.

Implementation of the on-line VStore "One-Click" service will involve at least some execution of programming in the mobile stations as well as implementation of user input/output functions and data communications through the network 15, from the mobile stations. Such input/output functions are generally carried out using a Customer Care Enterprise Solution (CCES). The CCES server 308 receives requests from the mobile stations and generates and sends the request responses. One of ordinary skill will recognize that the CCES may also process requests from other carrier systems within the network. In the example discussed more below, the CCES server receives the requests for multimedia content made by the user of mobile stations 13 using the URL provided to the mobile station and sends the content in response to the request.

CCES is an enterprise middleware web service. In FIG. 1, the request traffic between the CCES 308 and mobiles stations 13 may occur via Wireless Application Protocol (WAP) gateways, one of which is shown at 309. The WAP gateway 309 provides protocol conversions between WAP as used by the CCES and the protocols used on the Internet 23 or other IP Network, including IP traffic for the mobile stations 13. The CCES may also communicate with other network systems and servers via the private network 29.

At a high level, the CCES middleware comprises a web server layer and an application server layer. The architecture allows clients to send a request, for example for multimedia content, to a web server. The web server then forwards the client request to one of a number of application servers. Each application server has multiple applications running on it. The application server determines the proper application to process the client request, obtains the content or information requested, and sends the content back through the network to the requesting mobile station 13. To facilitate an understanding of the VStore "One-Click" service, it may be helpful to first consider the network and the CCES middleware web service in somewhat more detail.

Figure 2:
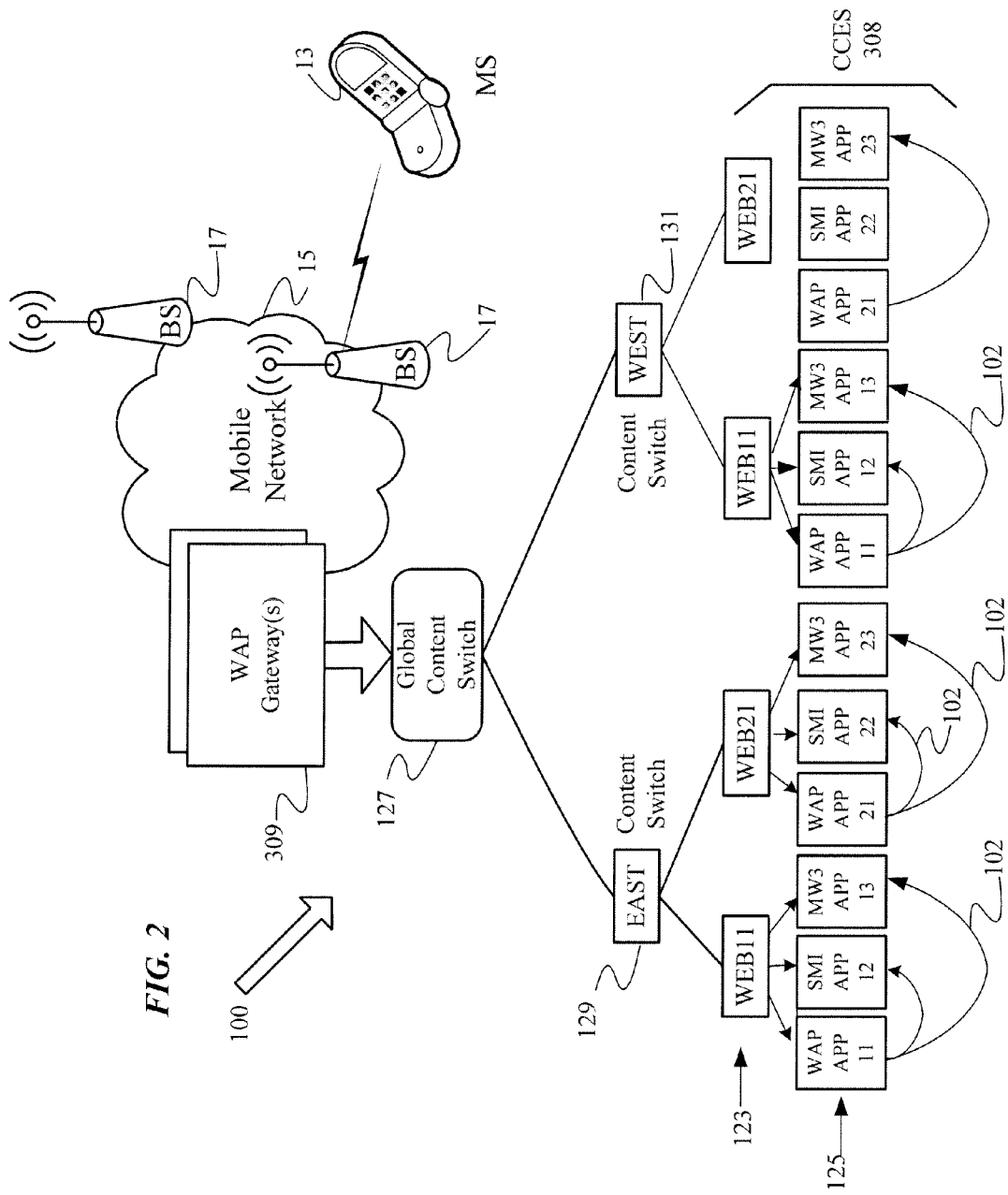
FIG. 2 is a high-level functional block diagram of a mobile carrier network and associated equipment for Customer Communication Enterprise Services (CCES), which may implement a VStore with "One-Click" service functions.

FIG. 2 illustrates a system 100 offering a variety of mobile communication services to users of any number of mobile stations. The example shows simply one mobile station (MS) 13 as well as general cloud representation of a mobile communication network 15. The network 15 provides mobile wireless communications services to any number of mobile stations 13, for example, via a number of base stations (BSs) 17. The network 15 generally may be any of a variety of available mobile networks, and the drawing shows only a very simplified example of a few elements of the network for purposes of discussion here. The network 15 allows users of the mobile stations such as 13 to initiate and receive telephone calls to each other as well as through the public switched telephone network or "PSTN" (not shown) and telephone stations connected to the PSTN. The network 15 typically offers a variety of other data services via the Internet, such as downloads, web browsing, email, etc.

With regard to the VStore "One-Click" service, the multimedia content requests implemented via CCES 308 use a WAP gateway 309 that allows mobile station 13 to communicate with CCES 308 via the network. For that purpose, the carrier may operate web servers, offering an interface to the VStore via the Internet. Hence, a mobile station may be used to access multimedia content which the mobile carrier makes available via the carrier's VStore website accessible through the Internet. For example, the website provides secure user access to click various URLs and download the multimedia content.

CCES services, in the example, are implemented using instances of the IBM Websphere Application Server (WAS). Websphere is a software product for integrating electronic business applications across multiple computing platforms, using Java-based Web technologies. The Websphere implementation offers a readily scalable distributed architecture. In such an implementation, there are multiple web servers 123, and each web server communicates with applications running on a number of associated application servers 125.

At a high level, the CCES middleware consists of servers that comprise the web server layer and the application layer. The architecture allows each of the mobile stations 13 to send a request through the WAP 309 to a global content switch 127 that then sends the request to one of the web servers 123. The web server 123 will then route the request to an application server 125. The application servers 125 contain the VStore application.

In the example, there is one global content switch 127 and two regional (one east one west) content switches 129, 131 to distribute the traffic. The CCES systems in the example include two web servers (WEB11 and WEB21) associated with each regional content switch. For simplicity, the example shows the application servers associated with each web server, one for user interface platforms using WAP application, one for platforms using SMI applications, and one for platforms using MW3 applications. The application servers WAP APP11, SMI APP 12, and MW3 APP 13 are associated with each web server WEB11, and application servers WAP APP 21, SMI APP22, and MW3 APP 23 are associated with each web server WEB21. Those skilled in the art will appreciate that this is a relatively simply example, and that an actual implementation may include more content switches, web servers and application servers.

The CCES middleware structure is setup so that the global content switch 127 will accept a request from a client and route that request to one of the regional content switches, that is to say in our example, either to the East content switch 129 or the West content switch 131 depending on where the request came from. The content switch then forwards the request to one of two different web servers, selected in a round robin fashion to distribute the processing load.

In the example, the East or West content switch determines which server platform WEB11 or WEB21 to forward the request in a round about fashion to distribute the process load. The server platforms WEB11 and WEB21 route the request to an application based on the context root of the request as explained in further detail below. In the current example, any request related to the VStore "One-Click" service has a context root that indicates to the web server that the request should be routed to the WAP application, regardless of the mobile station's user interface platform. If the application that the request is routed to is not the correct application to carry out the request, the request is rerouted to another application such as the SMI application or MW3 application, as indicated by the arrows 102. All rerouting through the CCES occurs on the application level. Once the request is rerouted to the correct application, the application processes the request, gathers the content, and sends the content back to the mobile station via the CCES components and the network.

Figures 3, 4:
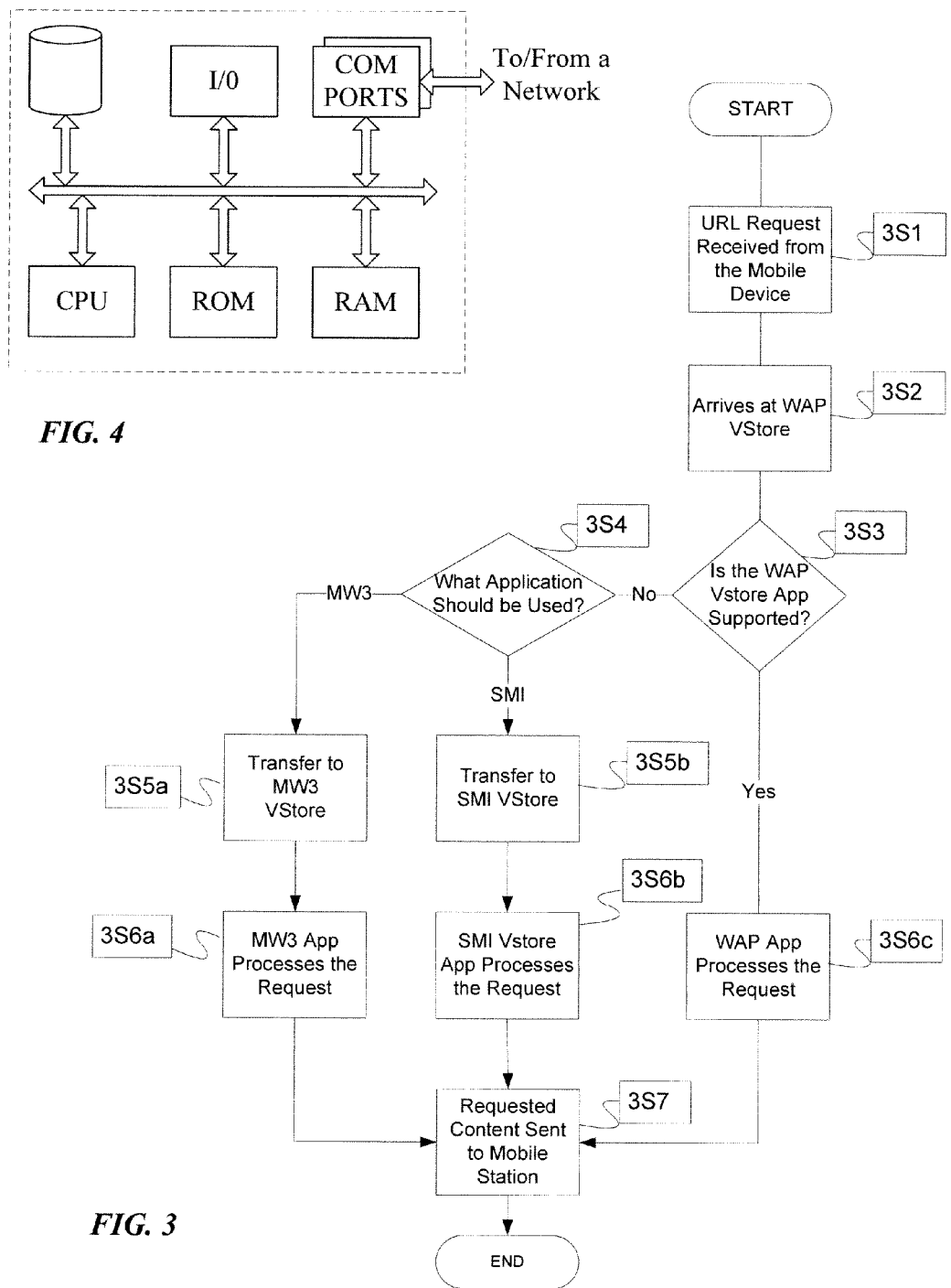
FIG. 3 is a flow chart of an exemplary process for using a single URL for routing and processing URL requests received from mobile stations using different user interface platforms.
FIG. 4 provides a functional block diagram illustrating a general purpose computer hardware platform as may be used as any of the servers in the examples provided.
Figure 5:
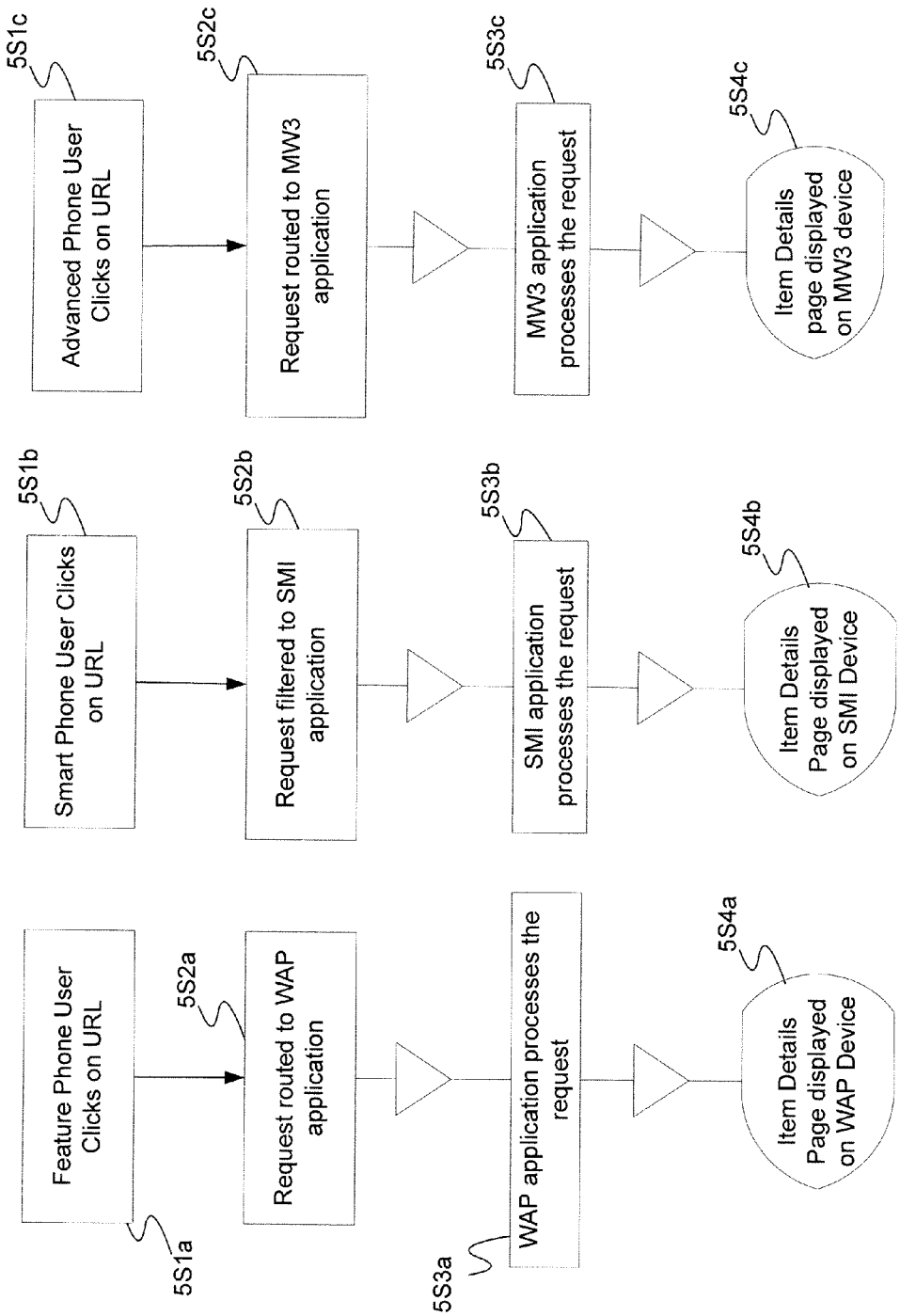
FIG. 5 is a flowchart of a process for routing and processing URL requests received from mobile stations using user interface platform specific URLs.

It may be helpful now to discuss examples of process flows used to carry out the VStore "One-Click" service. FIG. 3 is a flow chart of an exemplary process for using a single URL for routing and processing URL requests received from mobile stations using different user interface platforms. When the user of the mobile station clicks on a URL, such as a deep linking URL for an ad that promotes a particular MMS content, the mobile station sends the request through the network until it is received by a web server 23 at step 3S1. The web server then routes the request to a particular application at step 3S2 based on the context root string of the request. In the current example, all requests are sent to the WAP application regardless of user interface platform.

The context root string is part of the URL which identifies to the web server which application server should receive the request. For example in the URL http://vstore.vzw.com/storefront/sft.jsp, "storefront" is the context root. The context root string would be different for each application such that all URLs having context root strings referencing the SMI application will be routed to that application and the same for MW3 application. In the current example, any request related to the VStore "One-Click" service has a context that routes the request to the WAP VStore application for rerouting or processing, regardless of device platform. Although all requests are routed to the WAP application in the current example, it is contemplated that the SMI and MW2 applications may be configured to reroute requests as well.

Once the request arrives at the WAP VStore application at step 3S2, the application determines the proper application to process the request. This determination is made using the information in the header of the URL request received from the mobile station. The header is sent with the specific URL when the user clicks the link to create the URL request. The header contains information identifying the mobile station such that the network knows where to send the requested content. The header contains a user agent string that includes, among other things, the make and model information for the mobile station requesting the URL content. Based on this information, the WAP VStore application is able to determine whether it is supported by the user interface platform identified, thereby determining if it is the correct application to process the request at step 3S3. If the WAP VStore application determines that it is the correct application, it will process the request at step 3S6c and no rerouting is necessary. Processing the request includes retrieving the requested content identified in the URL in a format that is supported by the user interface platform of the requesting mobile station.

If the WAP VStore application determines that it is not the correct application, then it uses the header information to determine what application the request should be routed to at step 3S4. In the particular example provided, the WAP VStore application may route the request to the SMI VStore application for smart phones with user interface platforms that support SMI applications and to the MW3 VStore application for advanced phones with user interface platforms that support MW3 applications. Although only SMI applications and MW3 applications are mentioned in the current example, it is contemplated that the request may be routed to other applications supported by any user interface platform used on a mobile station.

If the WAP VStore application determines that the mobile station sending the request uses a user interface platform that supports SMI applications, the request will be rerouted to the SMI VStore application at step 3S5b. If the WAP VStore application determines that the mobile station sending the request uses a user interface platform that supports MW3 applications, the request will be rerouted to the MW3 VStore application at step 3S5a. All rerouting occurs at the application level. As a result, the rest of the network, including the web servers, need not be modified. Additionally, this minimizes the work that must be carried out by service providers such that they do not have to worry about sending more than one URL to all mobile stations. When new URL content is created, only one URL will need to be completed rather than three (or more if future user interface platforms are developed). This minimizes the likelihood that an incorrect URL will be sent to the mobile station and the chance of receiving content in a format incompatible with the user interface platform is reduced.

Once the request has been routed to the appropriate VStore application, the application will process the request. The SMI VStore application will process all SMI related requests at step 3S6b, the MW3 VStore application will process all MW3 related requests at step 3S6a, and the WAP VStore application will process all WAP related requests at step 3S6c. At a high level, processing the request involves identifying the information requested using the URL and retrieving that information. Once the requested content is retrieved, it will be sent back through the network to the mobile station at step 3S7, in the format compatible with the user interface platform on the particular mobile station.

The method above provides a cleaner user interface to the end users and also an easy-to-manage mechanism to handle the URL links. With this solution in place, the business and sales teams can now focus on the MMS content rather than worry about whether they are using the correct URL link for each device.

As shown by the above discussion, functions relating to the use of one URL link for specific URL content for routing and delivery to all mobile stations, independent of user interface platforms of different mobile stations, may be implemented on computers connected for data communication via the components of a data network, operating as any one or more of the servers discussed above relative to FIGS. 1-3. Although special purpose devices may be used, such devices also may be implemented using one or more hardware platforms intended to represent a general class of data processing device commonly used to run "server" programming so as to implement the web server, primary application server and/or secondary application server functions discussed above, albeit with an appropriate network connection for data communication.

Those skilled in the data processing and communications arts will appreciate that a general-purpose computer may be used to carry out server applications such as those used to provide the VStore "One-Click" service. A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code for the routing and rerouting MMS content requests and processing such requests well as associated stored data, e.g. files used for the thresholds and or to direct the paging, email and other report messages. The software code is executable by the general-purpose computer that functions as the web server, application server(s), and/or as a technician's terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology to determine the thread counts for each respective server and compare the counts to the appropriate lists of thresholds and provide the alerts and thread dump report pages, in essentially the manner performed in the implementations discussed and illustrated herein.

FIG. 4 provides a functional block diagram illustrating a general purpose computer hardware platform as may be used in the examples provided. FIG. 4 illustrates a network or host computer platform, as may typically be used to implement a server. A server, for example, includes a data communication interface for packet data communication. The server also includes a central processing unit (CPU), in the form of one or more processors, for executing program instructions. The hardware platform for a server typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of handling URLs for different mobile devices that use different user interface platforms, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the network operator into the computer platform of a web server and platforms of the associated application servers that will implement the rerouting, processing, etc. of the different URL requests. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible, non-transitory "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:
providing a first content page through a mobile communication network to one mobile station from amongst a plurality of mobile stations that use different user interface platforms, wherein:
the first content page contains a Uniform Resource Locator (URL) as a user selectable link to a second content page;
the URL is independent of a user interface platform of the one mobile station;
the URL is identical for each of the different user interface platforms;
the second content page contains content independent of the user interface platform of the one mobile station; and
the independent content is identical for each of the different user interface platforms;
receiving, at a first server through the mobile communication network, a request from the one mobile station, the request containing the identical URL and information identifying the user interface platform of the one mobile station;
obtaining, by the first server, the second content page based on the identical URL and the identifying information contained in the request by:
routing the request to one of a plurality of applications based on the information identifying the user interface platform of the one mobile station independently of the URL, wherein:
each user interface platform of the different user interface platforms is associated with an application of the plurality of applications;
the plurality of applications are executed on a second server; and
each application is configured to generate content pages, including the second content page containing the identical content, in an application format in accordance with processing capabilities of the user interface platform associated with the application;

receiving, by the first server from the second server, the second content page containing the identical content generated by the one application in an application format in accordance with processing capabilities of the identified user interface platform of the one mobile station; and sending, by the first server through the mobile communication network to the one mobile station, the second content page containing the identical content in the application format in accordance with processing capabilities of the identified user interface platform of the one mobile station for presentation to a user of the one mobile station.

2. The method of claim 1, wherein the step of routing the request comprises:

routing the request to a primary application of the plurality of applications, the primary application receiving the request based on information contained in the identical URL;

rerouting, by the primary application, the request to a secondary application of the plurality of applications, wherein:

the rerouting to the secondary application is based on the information identifying the user interface platform obtained by the primary application;

the primary application is configured to generate one or more content pages, including the second content page containing the identical content, in a format in accordance with a user interface platform different from the identified user interface platform of the one mobile station; and the secondary application is configured as the one application to provide one or more content pages, including the second content page containing the identical content, in the format in accordance with the identified user interface platform of the one mobile station; and receiving the second content page containing the identical content from the secondary application.

3. The method of claim 2, wherein the primary application is a WAP application and the secondary application is a type of application selected from the group consisting of a SMI application and a MW3 application.

4. The method of claim 2, wherein the request is routed to the primary application based upon a context root of the URL.

5. The method of claim 2, wherein the server is a web server and the applications run on more than one application server.

6. The method of claim 1, wherein the URL is a deep linking URL.

7. The method of claim 1, wherein the information identifying the user interface platform of the one mobile station is contained in the header of the request.

8. The method of claim 7, wherein the identifying information contained in the header comprises information identifying the one mobile station's make and model.

9. The method of claim 1, wherein the identified user interface platform is one of a plurality of user interface platforms and the one mobile station is a mobile station of one of a plurality of types of mobile stations, the identified user interface platform being the only user interface platform used by the one mobile station.

10. The method of claim 1, wherein:

a first application of the plurality of applications is configured to generate content pages in an application format compatible with wireless application protocol (WAP) applications; and a second application of the plurality of applications is configured to generate content pages in an application format compatible with one of smart mobile interface (SMI) and mobile web 3.0 (MW3) applications.

11. A non-transitory machine readable medium having a program for execution by a processor of a computer, wherein the program configures the computer to implement functions comprising:

providing a first content page through a mobile communication network to one mobile station from amongst a plurality of mobile stations that use different user interface platforms, wherein:

the first content page contains a Uniform Resource Locator (URL) as a user selectable link to a second content page;

the URL is independent of a user interface platform of the one mobile station;

the URL is identical for each of the different user interface platforms;

the second content page contains content independent of the user interface platform of the one mobile station; and the independent content is identical for each of the different user interface platforms;

receiving, at a first server through the mobile communication network, a request from the one mobile station, the request containing the identical URL and information identifying the user interface platform of the one mobile station;

obtaining, by the first server, the second content page based on the identical URL and the identifying information contained in the request by:

routing the request to one of a plurality of applications based on the information identifying the user interface platform of the one mobile station independently of the URL, wherein:

each user interface platform of the different user interface platforms is associated with an application of the plurality of applications;

the plurality of applications are executed on a second server; and each application is configured to generate content pages, including the second content page containing the identical content, in an application format in accordance with processing capabilities of the user interface platform associated with the application;

receiving, by the first server from the second server, the second content page containing the identical content generated by the one application in an application format in accordance with processing capabilities of the identified user interface platform of the one mobile station; and sending, by the first server through the mobile communication network to the one mobile station, the second content page containing the identical content in the application format in accordance with processing capabilities of the identified user interface platform of the one mobile station for presentation to a user of the one mobile station.

12. The non-transitory machine readable medium of claim 11, wherein the function of routing the request comprises:

routing the request to a primary application of the plurality of applications, the primary application receiving the request based on information contained in the identical URL;

rerouting, by the primary application, the request to a secondary application of the plurality of applications, wherein:

the rerouting to the secondary application is based on the information identifying the user interface platform obtained by the primary application;

the primary application is configured to generate one or more content pages, including the second content page containing the identical content, in a format in accordance with a user interface platform different from the identified user interface platform of the one mobile station; and the secondary application is configured as the one application to provide one or more content pages, including the second content page containing the identical content, in the format in accordance with the identified user interface platform of the one mobile station; and receiving the second content page containing the identical content from the secondary application.

13. The non-transitory machine readable medium of claim 11 wherein the URL is a deep linking URL.

14. The non-transitory machine readable medium of claim 11, wherein information identifying the user interface platform of the one mobile station is contained in the header of the request.

15. The non-transitory machine readable medium of claim 11, wherein:

a first application of the plurality of applications is configured to generate content pages in an application format compatible with wireless application protocol (WAP) applications; and a second application of the plurality of applications is configured to generate content pages in an application format compatible with one of smart mobile interface (SMI) and mobile web 3.0 (MW3) applications.

16. A mobile station service provider system comprising:

a network;

at least one computer platform, each computer platform comprising a central processing unit and being coupled for communication via the network;

a primary application server implemented on the at least one computer platform, wherein the primary application server is configured to:

(i) receive a request for a content page from one mobile station from amongst a plurality of mobile stations that use different user interface platforms, wherein:

the request containing contains a Uniform Resource Locator (URL);

the URL is independent of a user interface platform of the one mobile station;

the URL is identical for each of the different user interface platforms;

the content page contains content independent of the user interface platform of the one mobile station;

the independent content is identical for each of the different user interface platforms; and the request contains an identification of the user interface platform used by the one mobile station;

(ii) identify independently of the identical URL which one of a plurality of applications is needed to carry out the request from the one mobile station using the identification of the user interface platform; and (iii) route the request to the identified application; and a secondary application server implemented on the at least one computer platform, wherein the secondary application server is configured to:

(i) receive, by a secondary application on the secondary application server, the routed request for the content page from the primary application server, when the identified application is the secondary application;

(ii) obtain the content page containing the identical content based on the identical URL provided in the request; and (iii) send the requested content page containing the identical content to the one mobile station in an application format in accordance with processing capabilities of the identified user interface platform of the one mobile station.

17. The system of claim 16, wherein the primary application server is further configured to:

receive, by a primary application on the primary application server, the routed request, when the identified application is the primary application;

obtain the content page containing the identical content based on the identical URL provided in the request; and send the requested content page containing the identical content to the one mobile station in an application format in accordance with processing capabilities of the identified user interface platform of the one mobile station, the application format provided by the primary application being different from the application format provided by the secondary application.

18. The system of claim 16, wherein the primary application server is configured to receive the request for the content page based on a context root of the URL.

19. The system of claim 16, wherein the primary application server is configured to identify which one of the plurality of applications is needed to carry out the request based on information in the header of the URL.

20. The system of claim 16, wherein the primary application is a WAP application and the secondary application is a type of application selected from the group consisting of a SMI application and a MW3 application.

21. The mobile station service provider system of claim 16, wherein the secondary server is configured to send the requested content page to the one mobile station in an application format compatible with one of wireless application protocol (WAP), smart mobile interface (SMI), and mobile web 3.0 (MW3) applications.

22. A system comprising:

a primary application configured to receive a request for a content page from one mobile station amongst a plurality of mobile stations that use different user interface platforms, wherein:

the request contains a uniform resource locator (URL) and an identification of the user interface platform of the one mobile station;

the URL is independent of the user interface platform of the one mobile station;

the URL is identical for each of the different user interface platforms;

the content page contains content independent of the user interface platform of the one mobile station;

the independent content is identical for each of the different user interface platforms; and the primary application uses the identification of the user interface platform of the one mobile station independently of the identical URL to identify a correct one of a plurality of applications to process the request;

a secondary application configured to receive the identical URL request sent to the secondary application from the primary application upon determination by the primary application that the secondary application is the correct application to carry out the request, wherein the secondary application processes the request to obtain the content Page containing the identical content in an application format in accordance with processing capabilities of the identified user interface platform of the one mobile station; and a web server comprising a data communication interface, a central processing unit, and a program storage, wherein the web server is configured for:
   receiving the request for the content page from the mobile station and routing the request to the primary application; and
   receiving the content page containing the identical content requested by the mobile station from the secondary application in the application format in accordance with processing capabilities of the identified user interface platform of the one mobile station and sending the content page containing the identical content requested to the mobile station in the application format received from the secondary application.

23. The system of claim 22, wherein the primary application is a WAP application and the secondary application is a type of application selected from the group consisting of a SMI application and a MW3 application.

24. The system of claim 22, wherein the web server routes the request for content to the primary application based on a context root in the URL.

25. The system of claim 22, wherein the secondary application is configured to process the request to obtain the requested content in an application format compatible with one of wireless application protocol (WAP), smart mobile interface (SMI), and mobile web 3.0 (MW3) applications.

* * * * *